United States Patent
Hirschman et al.

(10) Patent No.: US 7,623,637 B2
(45) Date of Patent: *Nov. 24, 2009

(54) SYSTEM AND METHOD FOR RECONCILING BILLING MISMATCH

(75) Inventors: Edward Hirschman, Princeton, NJ (US); Jeffrey Bak, Manasquan, NJ (US); Avanish Pande, Marlboro, NJ (US); Aftab Hussain, Plainsboro, NJ (US); John Cashman, Princeton, NJ (US)

(73) Assignee: ITXC IP Holdings S.a.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 11/619,053

(22) Filed: Jan. 2, 2007

(65) Prior Publication Data

US 2007/0165797 A1    Jul. 19, 2007

Related U.S. Application Data

(63) Continuation of application No. 10/638,652, filed on Aug. 11, 2003, now Pat. No. 7,167,549.

(51) Int. Cl.
 *H04M 15/00* (2006.01)
(52) U.S. Cl. .................... 379/114.08; 379/114.02; 379/114.06
(58) Field of Classification Search ............ 379/114.08, 379/114.02, 114.06, 114.03
See application file for complete search history.

(56) References Cited

U.S. PATENT DOCUMENTS

| 6,542,588 B1 * | 4/2003 | Mashinsky ............. 379/114.02 |
| 7,167,549 B2 * | 1/2007 | Hirschman et al. ..... 379/114.08 |

\* cited by examiner

*Primary Examiner*—Barry W Taylor
(74) *Attorney, Agent, or Firm*—Kaplan Gilman & Pergament LLP

(57) ABSTRACT

A system and method for reconciling the differences in pricing breakout definitions between telecommunication carriers so that rates and codes can be communicated between carriers in a format that is compatible with the systems of the respective carriers.

15 Claims, 6 Drawing Sheets

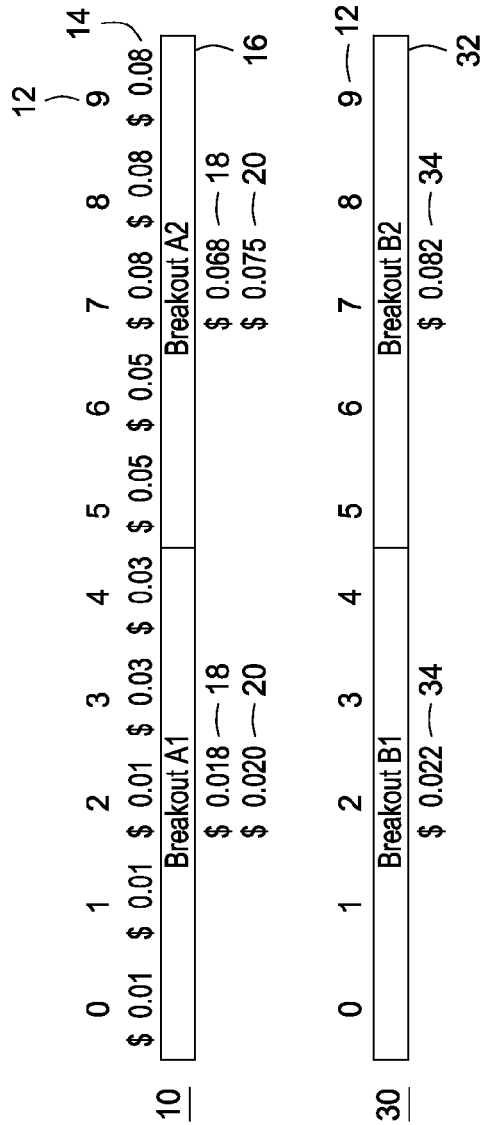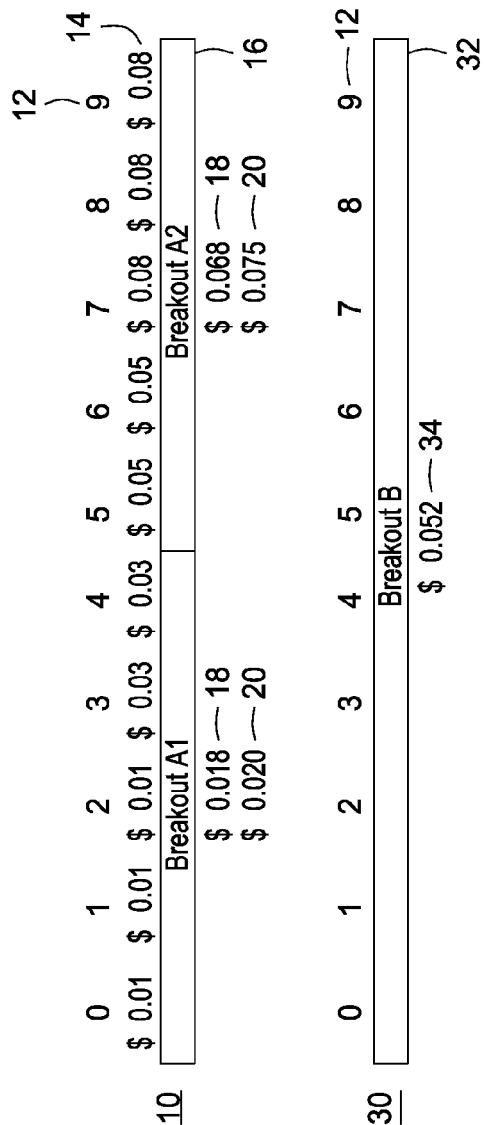

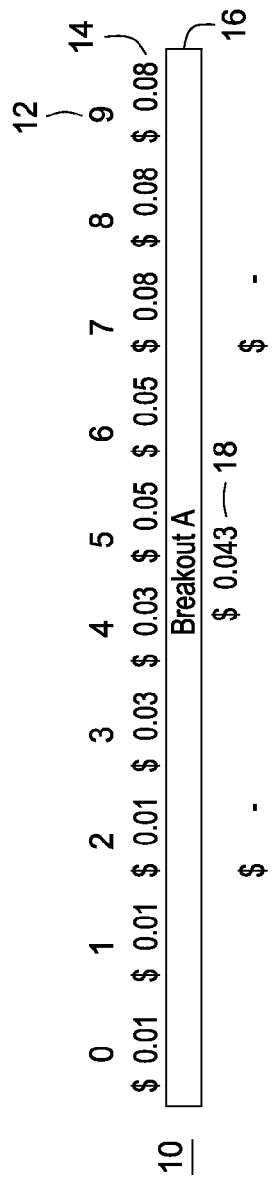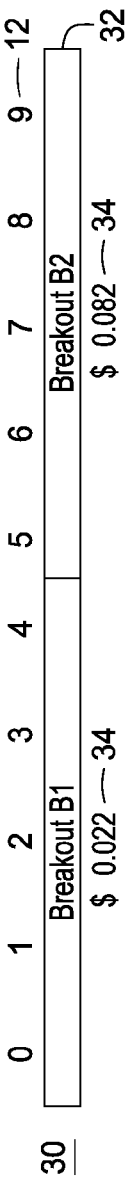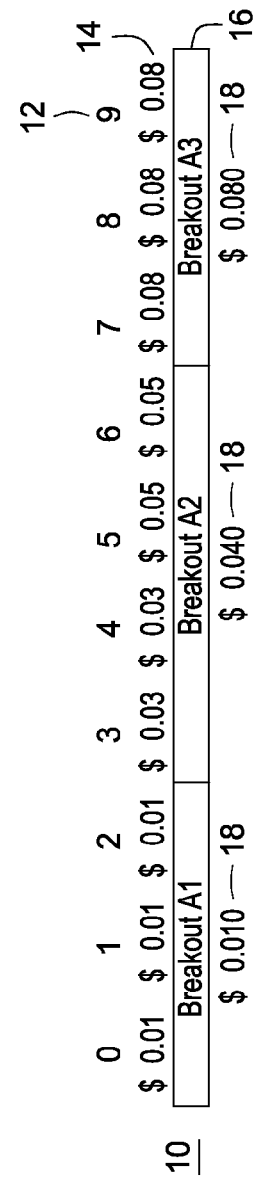
FIG. 3
FIG. 4

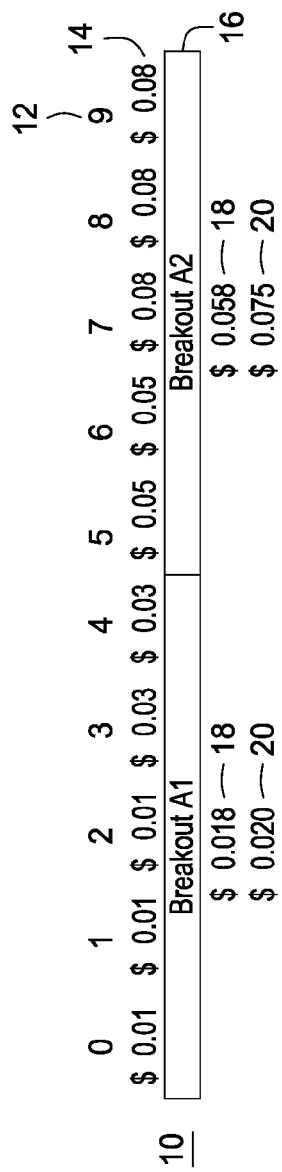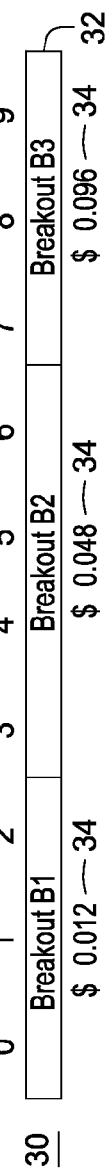
FIG. 5
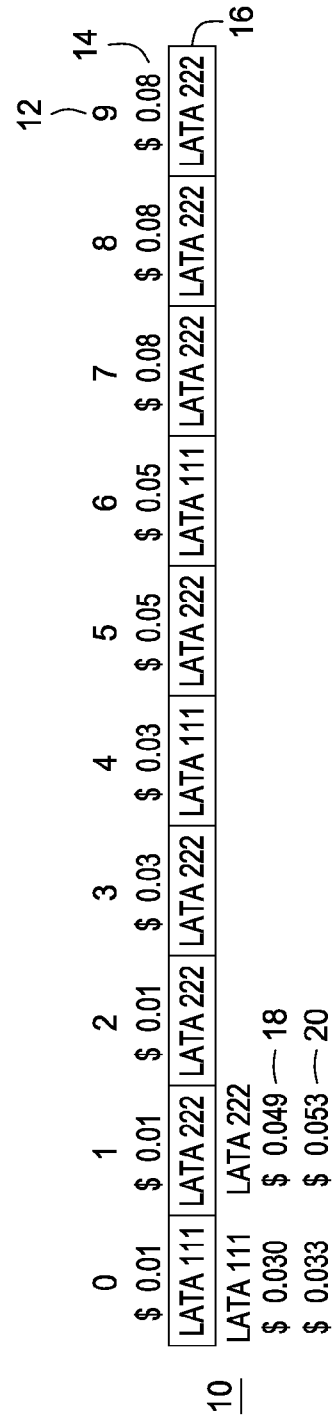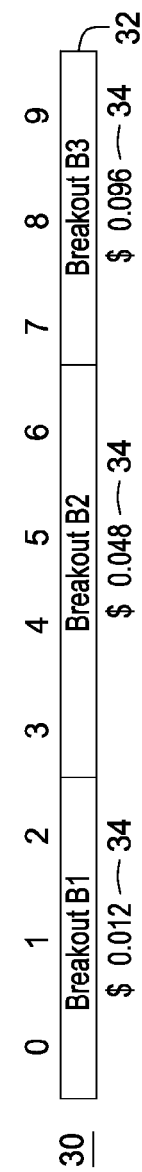
FIG. 6

| Buyer | 21_ | | | | | | | | | |
|---|---|---|---|---|---|---|---|---|---|---|
| Seller | | LATA 210 | LATA 211 | LATA 212 | LATA 213 | LATA 214 | LATA 215 | LATA 216 | LATA 217 | LATA 218 | LATA 219 |
| Cost | | 0.01 | 0.02 | 0.02 | 0.04 | 0.03 | 0.01 | 0.07 | 0.06 | 0.05 | 0.02 |
| Estimated Traffic (mins/hr) | | 100 | 50 | 40 | 60 | 20 | 10 | 10 | 30 | 120 | 70 |

FIG. 8

| 100 | 50 | 40 | 60 | 20 | 10 | 10 | 30 | 120 | 70 |
|---|---|---|---|---|---|---|---|---|---|
| x .01 | x .02 | x .02 | x .04 | x .03 | x .01 | x .07 | x .06 | x .05 | x .02 |
| 1.0 + | 1.0 + | 0.8 + | 2.4 + | 0.6 + | 0.1 + | 0.7 + | 1.8 + | 6.0 + | 1.4 |

= 510 total minutes

= $\frac{15.8}{510}$ → 0.031

FIG. 8A

SYSTEM AND METHOD FOR RECONCILING BILLING MISMATCH

CROSS REFERENCE TO RELATED APPLICATIONS

This application is a continuation application of U.S. patent application Ser. No. 10/638,652, filed on Aug. 11, 2003, the disclosure of which is hereby incorporated by reference in its entirety.

FIELD OF THE INVENTION

The present invention relates to the field of telephony, and more particularly, to a system and method for reconciling the differences in pricing breakout definitions between telecommunication carriers so that rates and codes can be communicated between carriers in a format that is compatible with the systems of the respective carriers.

BACKGROUND OF THE INVENTION

The basic model for completing a telephone call is changing. Rather that rely completely on end to end circuit switched connections, more and more phone calls are completed using, at least in part, packet switching techniques. More systems and equipment are being developed that are dedicated to transmission of voice communication on the Internet. As more of these systems and equipment become available, the complexity of the communications matrix increases.

In IP telephony systems it is known to conduct a telephone call utilizing a combination of public switched telephone network (PSTN) links, and packet telephony links. An example of such a system is shown in U.S. Pat. No. 6,404,864 ("the '864 patent") owned by the assignee of the present invention. In such prior systems, an "originating gateway" takes the call from the PSTN to the Internet, and a "terminating gateway" places the call back onto the PSTN at a remote location after removing it from the Internet. Thus, a long distance call may have three "legs", a first PSTN leg from the calling telephone to the originating gateway, a second leg from the originating gateway to a terminating gateway, and a third leg from a terminating gateway to a called telephone. The '864 patent is directed to a system that helps the originating gateway pick which of several terminating gateways that are located in the remote location should be selected to complete the call from the Internet, over a PSTN link, to a destination terminal. The '864 patent is incorporated herein in its entirety by reference.

There are costs associated with the origination and termination of a call. Typically, a carrier of an internet call is a buyer of telecommunication services on one end where it pays a termination fee to a carrier in order for calls routed to that terminating gateway to be terminated in the PSTN associated with that gateway. On the other end a carrier of an internet call is a seller of telecommunication services where it charges a fee to a carrier wishing to route calls through an originating gateway onto the internet. It is therefore essential to the success of a carrier to pay the correct amount to transport traffic on competing networks and to charge the correct amount when transporting traffic, otherwise large margin losses will occur. Therefore knowledge of proper rates is essential.

By way of definition, phone numbers define a specific telephone set. Each number begins with a country code, which is then followed by increasingly specific digits that eventually uniquely identify the specific physical line any call must be directed to. A "code" is any collection of phone numbers that can be summarized at a higher level by simply listing the digits those phone numbers have in common. For example, phone numbers in China begin with country code 86. "86" would be the highest level code for China. "864" would be a more specific "code" within China. So, codes can exist at multiple levels.

Currently, when carriers buy or sell to each other, they exchange rates and code information via fax and/or email. A common practice in the industry is to group codes together, where appropriate, and apply the same price. A common industry name for these code groupings is "Pricing Breakouts."

Typically the rates are given in a format upon which the issuer of the rates (Carrier A) has standardized, which format generally is not compatible with the format the receiver of the rates (Carrier B) has standardized and natively supports. As such, the rates of the issuing carrier (Carrier A) must be imported or typed into the systems of Carrier B. The point of entry may be the system that actually routes calls to suppliers (e.g. switch) or a system that is upstream from the switch (e.g. a billing system or rate entry system). In the case of faxes, the process of typing in rates in inherently slow and error prone. Receiving rates via email and spreadsheet is much less error prone, but usually requires manual or automated manipulation of the data to make it compatible with the systems of Carrier B.

Another method of rate exchange is via web interface. Specifically, some buyers require the seller to input rates via the buyer's web interface. Arbinet is one company that employs such a technique. In this case, the seller must take their rates and type them into a web page, thus the onus is on the seller to manipulate or type the data.

When Carrier A and Carrier B use different code groupings for Pricing Breakouts with the same name, the process becomes much more complicated. It is not a simple matter of comparing apples to apples and entering a new rate. Carrier B must compare its code definitions to Carrier A's definitions, and reconcile the two to match. This process is typically performed manually or by an automated process. This extra work that Carrier B must undertake to resolve the codes is time consuming and often slows down or stops Carrier A from being a supplier in the "Considered set" for Carrier B. This process is error prone and is often a source of "code disputes" between buyer and seller.

Efforts have been made to standardize the carrier community on code definitions. About 95% of destinations have standardized codes across most carriers and do not have code mismatches, but the capability is needed for certain destinations like Mexico, Philippines, Brazil, Russia, Peru and Western European Mobile, where a standard definition has not materialized. The International Telecommunications Union (ITU) publishes a periodic updated list of country and regional codes. Arbinet markets a product entitled AXCESS-CODE$^{SM}$ that purports to provide carriers with a periodically updated database of over 10,000 valid calling codes and a unique market identifier for every destination in the world. These lists of standardized codes have been adopted to a limited extent but by no means is such adoption widespread.

Moreover, each carrier generally has its own definition of codes due to the granularity they wish to use in the buying and routing process. For example, some carriers do not want to spend the time and effort to route/buy with specific granularity to destinations within the United States so they route to the broad specificity of "+1." These carriers generally pay the highest rates as a result. At the other end of the spectrum other carriers wish to buy at the most competitive level possible to the US and breakout to extremely fine levels as provided by the Local Exchange Routing Guide (LERG) database. These carriers can have tens of thousand of codes that represent up to 7 digits of depth in their routing tables to the US (NPA-NXX routing).

Further complicating matters, Carrier A and B may be from different countries with different currencies, and this can cause additional barriers to doing business. One carrier or the other may have to convert currencies to be acceptable to the other. This can be manual or automatic. The method by which the currencies are converted can vary (e.g. pick a standard index and update conversion rate 1×/month).

Finally, quality parameters are also often exchanged that relate to the code makeup of pricing breakouts. Examples of such quality parameters include Answer Seizure Ratio (ASR), Call Duration and Post-Dial Delay (PDD).

Thus, there exists a need for a system and method to enable carriers to communicate rate information quickly, consistently and cost effectively thereby reducing the impedance of doing business between carriers. Such a system and method would have the potential to become the true industry standard for intercarrier rate/code/quality information exchange.

It is therefore an object of the present invention to provide automated software that reconciles the differences in pricing breakout definitions between buyers and sellers of communication services.

It is a further object of the present invention to provide a universal translation system and method for use between telecommunication carriers buying from/selling to each other that formats rate/code/quality information with the data structure/currency and medium (fax/email) in which the other carrier is equipped to see it.

It is a further object of the present invention to provide the foregoing system and method wherein there is no manual effort associated with issuing or receiving rates to/from the other carrier, despite the fact that the carriers may use different currencies and code breakout definitions.

It is still a further object of the present invention to provide the foregoing system and method wherein rates can be sent and accepted any time and automatically put into route by the originator at a frequency no less than the minimum frequency at which the originator changes its routing.

It is yet a further object of the present invention to provide a full audit trail for all transactions between carriers.

These and other objects of the invention disclosed will become more apparent from the description of the invention to follow.

SUMMARY OF THE INVENTION

The above and other problems of the prior art are overcome in accordance with the present invention that relates to a system and method for translating and reconciling rate/code/quality information communicated between carriers desiring to buy from/sell to each other communication services.

In accordance with the invention, a system and method is provided which allows Carrier A to electronically propagate rates and codes for routes it wishes to sell to Carrier B, whereby rates and codes are generated in a way by Carrier A such that no human intervention is required on behalf of Carrier A to convert them to the format that Carrier B requires. The system and method of the present invention auto-reconciles the differences in pricing breakout definitions between carriers. Rates and codes arrive at Carrier B in a format that is compatible with Carrier B's systems. As such, Carrier B does not need to review the rates or manually or semi-manually enter them into Carrier B's systems. In this way rates can be sent periodically or on demand in the event of a rate change.

In preferred embodiments the invention may be adapted to reconcile format differences between carriers to permit for example Carrier B to direct upload the rates and codes. In another preferred embodiment the present invention is adapted to interface to any device of a carrier that accepts rates such as but not limited to switch, billing system or the like. Alternatively, the invention can be deployed in a "custom" setup for devices not immediately compatible with the system or "library".

In a most preferred embodiment where required the present invention is adapted to transparently handle all currency conversions between carriers.

BRIEF DESCRIPTION OF THE DRAWINGS

FIGS. 1-6 are graphic depictions of possible scenarios the present invention is designed to address.

FIG. 8 is a graphic depiction of a buyer/seller code mismatch containing information the present invention can use to resolve the mismatch.

FIG. 8A is a representation of application of a preferred embodiment of the present invention to the information of FIG. 8.

DETAILED DESCRIPTION OF THE INVENTION

Figure 7:
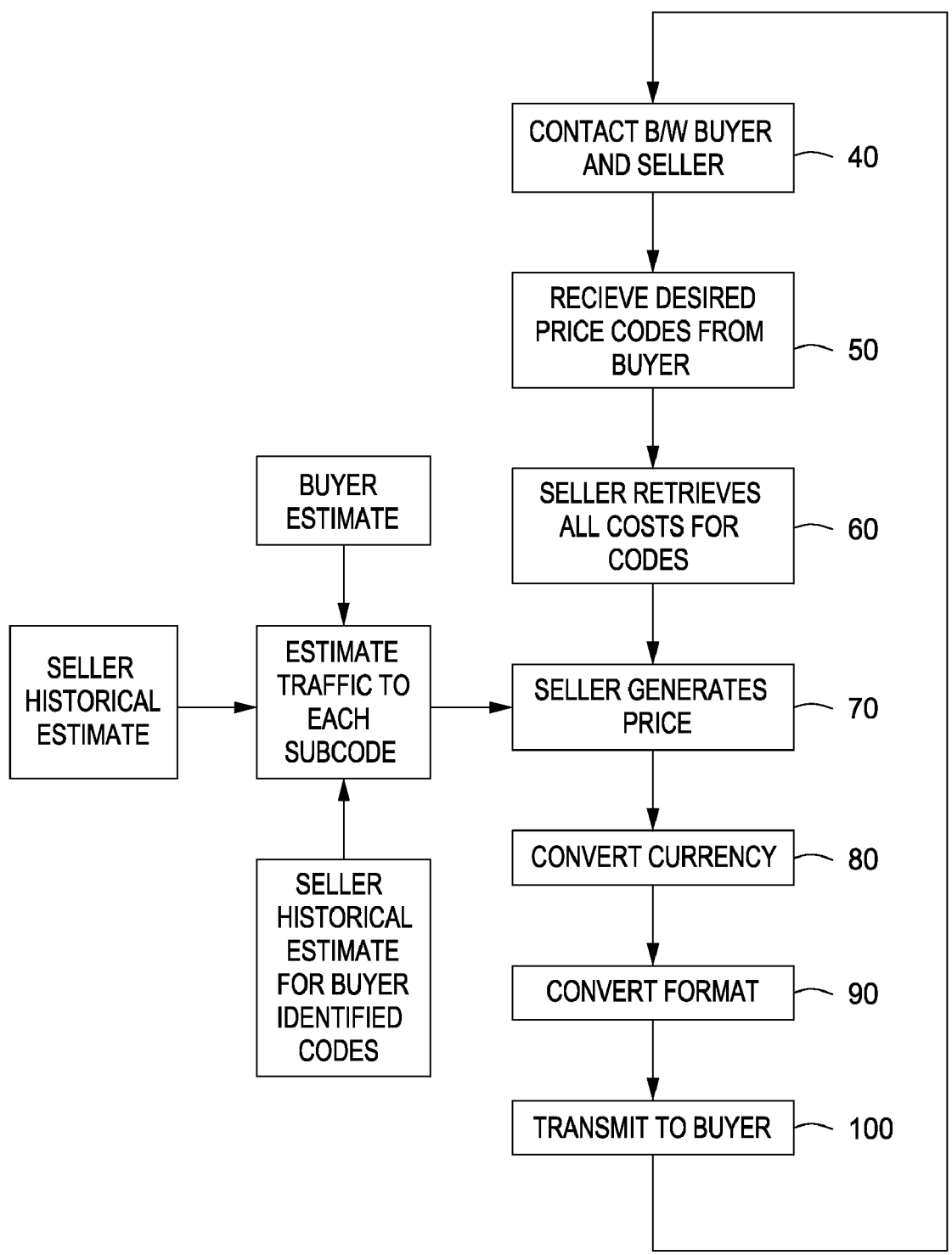
FIG. 7 is a flowchart showing the method by which the present invention reconciles code and rate information between a buyer and seller.

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

In order to better understand the present invention it is useful to understand the scenarios to which the invention may be applied.

FIGS. 1-6 set forth the various scenarios of code matching/mismatching the present invention is designed to address. The scenarios set forth herein are merely exemplary and are not intended to be exhaustive. It will be understood by those skilled in the art that other scenarios not specifically described herein are capable of being addressed by the present invention.

Now referring to FIGS. 1-6 the carrier definitions 10 of Carrier A (seller) are compared to the definitions 30 of carrier B (buyer). Referring to carrier definition 10 a plurality of codes 12 is set forth with corresponding seller costs 14. The seller breakout 16 defines the set of seller codes 12 and associated costs 14, according to which the seller bases its weighted cost 18 and subsequently establishes its selling price 20. For the sake of simplicity in this and scenarios shown in FIGS. 2-6 weighted cost 18 is determined by a weighted average of costs 14.

The weighting may be calculated by a percentage of calls to be routed. More specifically, if of all calls that begin with dialed digits between 0 and 4, 15% begin with the digit 3, than the 0.03 cost associated with digit 3 is assigned a 15 percent weight. By calculating a weighted average based upon traffic to the sub-codes within a higher-level, summary code, a weighted average cost for the high-level code can be calculated.

For further simplification in each of the scenarios depicted in FIGS. 1-6 selling price 20 is determined by marking up the weighted cost 18 by ten percent.

Carrier B (buyer) definition 30 comprises a set of codes 12, buyer breakout 34 and buyer target price to buy 34.

Now referring to FIG. 1, the scenario represents a "code match" wherein the Carrier A (seller) breakout 16 for the respective codes corresponds to Carrier B (buyer) breakout 32 for the same codes, permitting buyer and seller to communicate intelligently regarding the sale of termination or origination services. That is, carrier B (buyer) can determine whether purchasing rates from Carrier A is economically advantageous. In the real world such a code match is infrequent at best.

Now referring to FIG. 2, the scenario represents a "superset", that is, Carrier A has established a breakout 16 consisting of two units breakout, A1 and breakout A2, for the codes in the calling area, while Carrier B breakout 16 consists of a single unit, breakout B, comprising the same codes in the area. Carrier B has based on some criteria the target price to buy 34 is $0.052 while Carrier A has established selling price for breakout A1 as $0.020 and breakout A2 as $0.075. In this scenario Carrier B will either not buy at all from Carrier A because of the code mismatch or will only send traffic to breakout A1.

Now referring to FIG. 3, the scenario represents a "subset", that is the reverse of the "superset" depicted in FIG. 2. Carrier A may have difficulty selling to Carrier B because of the code mismatch and since Carrier B may not be inclined to pay what it considers a premium for completing calls to phone numbers starting with numbers 0-4.

Now referring to FIGS. 4 and 5, the scenarios depict an overlap of Carrier B with Carrier A (FIG. 4) and vice versa (FIG. 5). Again, in each of these scenarios a mismatch in code pricing prevents a simple conclusion as to whether paying Carrier A to terminate calls in the particular codes is economically advantageous.

Now referring to FIG. 6, where carrier A employs LATA (Local Access and Transport Area)-based breakouts 16, and carrier B does not, reconciliation of the breakout pricing is difficult and may prevent the carriers from doing business.

Now referring to FIG. 7, a method of reconciling mismatched code pricing between buyers and sellers is disclosed. The invention is described in terms of an algorithm for use in reconciling pricing breakouts between a seller and buyer. In step 40 contact is made between a buyer and seller for the purpose of considering a purchase/sale of communication services. In step 50 the seller receives from the buyer the codes the buyer wishes to purchase from the seller. In this step 50 the seller may further optionally receive breakout name(s), the target price the buyer wishes to pay, a traffic estimate over a given period of time and a number of quality measures associated with each breakout. In step 60, upon receipt of the information in step 50, the seller retrieves from its database the cost for each and every code within the group of breakouts identified by the buyer. In step 70 the seller generates a price. The generation of price includes determining the estimated amount of traffic to each lower-level code within the buyer's pricing breakout. This determination is made based on one or more of the traffic estimate of the buyer, overall historical traffic patterns of the seller and/or the seller's historical traffic patterns for the segment identified by the buyer in step 50. The seller then multiplies each cost by code retrieved in step 60 by the estimated traffic by each code determined above, and the products of these operations are summed. The seller divides the sum by the number of minutes to determine the average cost per minute for that set of codes associated with that breakout. The seller then creates a price in whatever currency units it employs using one or more pricing methods such as "cost plus", "market based pricing", etc.

In step 80, if required, the price is converted to the buyer's local currency using a method known in the art. If the price needs to be converted to the buyer's format, the method set forth below may be employed in block 90. Upon concluding these operations in block 100 the price is transmitted to the buyer.

By way of example, now referring to FIG. 8, a buyer identifies to a seller all 3-digit codes beginning with the numbers "21". Seller would retrieve from its database the costs for each 3-digit code within that range, including 210, 211, 212, and so on. In this example the costs are listed as $0.01 per minute for code 210, 0.02 for code 211 and so forth. For each of those 3-digit codes, seller would then determine an estimated amount of traffic using any one or all of the parameters set forth above. For example code 210 might have an average of 100 minutes per hour, code 211 might have 50 minutes per hour, and so on as shown in FIG. 8. Now referring to FIG. 8A, multiplying the costs for each code by the amount of estimated traffic for each code, summing the products (15.8 in this example) and dividing by the total number of minutes (510) results in an average cost per minute for the buyer's requested breakout of $0.031 per minute. Therefore, even though the buyer and seller breakouts do not match, the seller is able to generate a cost for that particular breakout identified by the buyer. The seller can then adjust this cost to generate a final price to be conveyed to the buyer.

Expected quality could be calculated in a similar way (expected ASR performance could differ based on code mix in a breakout).

Figure 9:
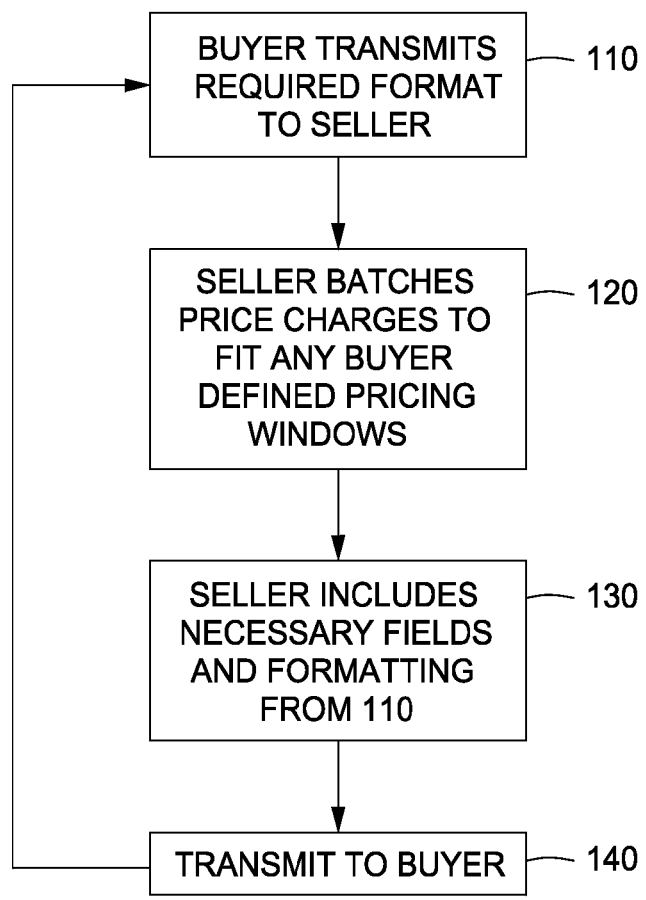
FIG. 9 is a flowchart showing a preferred embodiment of the method by which the present invention reconciles format information between a buyer and seller.

As mentioned hereinabove it is often the case that the formats employed by buyers and sellers are not always the same. It is therefore desirable to provide a method for converting the format of the seller to one readable by the buyer. Now referring to FIG. 9, in a preferred embodiment of the invention if such a conversion is required as referenced in block 90 of FIG. 8, in block 110 the buyer transmits to the seller its required format including at least the format for its code and rate information. The buyer may further include format data such as but not limited to information relating to names, fields, text formatting, file format, medium to communicate rates, time and date window during which the transmission should be made (e.g., Friday before 3:00 p.m.) and the like. In block 120 the seller batches price changes, such as those generated in block 70 hereinabove (or block 80 if it is converted to a different currency) to fit any buyer-defined pricing windows. The seller in block 130 includes the necessary fields and formatting specified in block 110. The data is transmitted to the buyer in block 140.

While the present invention is described with respect to specific embodiments thereof, it is recognized that various modifications and variations may be made without departing from the scope and spirit of the invention, which is more clearly and precisely defined by reference to the claims appended hereto.

What is claimed is:

1. A method for processing a telephone call taking place in a telephone network between a seller and buyer of services communicating on the telephone network, the telephone call having a calling code associated therewith, said method comprising:
retrieving a breakout of telecommunication services, associated with the telephone call, from the seller of the services, the seller breakout including a plurality of seller calling codes and a plurality of respective prices, said retrieving step being performed by a computer;
retrieving a breakout of the telecommunication services from the buyer of the services, the buyer breakout including one or more buyer calling codes and one or more respective prices;
adjusting the seller calling code breakout to provide a second seller calling code breakout that corresponds to the buyer calling code breakout;
whereby prices for the calling codes in the second seller calling code breakout match the buyer prices of the corresponding buyer calling codes; and
processing the telephone call in the network using the adjusted price.

2. The method of claim 1 further comprising:
performing the adjusting step of without human intervention.

3. The method of claim 1 further comprising:
converting a format data of code and rate information included in the seller price breakout from the seller to a format readable by the buyer of the telecommunication services.

4. The method of claim 3 wherein the format data includes formatting information relating to at least one of the group consisting of: names, fields, text formatting, file format, medium to communicate rates, and a time and date window during which the telephone call should be conducted.

5. A method for processing a telephone call taking place in a telephone network between a seller and buyer of services communicating on the telephone network, the telephone call having a calling code associated therewith, said method comprising:
retrieving a first price breakout of telecommunication services, associated with the telephone call, from the seller of the services, said retrieving step being performed by a computer;
retrieving a second price breakout of the telecommunication services from the buyer of the services;
reconciling the first price breakout with the second price breakout to generate a final price for the telecommunication services;
processing the telephone call between the buyer and the seller using the final price;
obtaining estimated telecommunication traffic indicative of the telecommunication services for which the first and second price breakouts were retrieved; and
calculating the final price of the telecommunication services using the obtained estimated traffic.

6. The method of claim 5 wherein the estimated telecommunication traffic is based on one or more of the group consisting of:
a) a traffic estimate of the buyer;
b) overall historical traffic patterns of the seller; and
c) where the buyer identifies a segment of a network for use of the telecommunication services, historical traffic patterns of the seller within the identified segment.

7. A system for processing a telephone call comprising a computer; and software that, when executed, is operable to:
retrieve a breakout of telecommunication services, associated with the telephone call, from a seller of the services, the seller breakout including a plurality of seller calling codes and a plurality of respective prices;
retrieve a breakout of the telecommunication services from a buyer of the services, the buyer breakout including one or more buyer calling codes and one or more respective prices;
adjust the seller calling code breakout to provide a second seller calling code breakout that corresponds to the buyer calling code breakout;
adjust prices for the calling codes in the second seller calling code breakout to match the buyer prices of the corresponding buyer calling codes; and
process the telephone call for a given calling code between the buyer and the seller using the adjusted price.

8. The system of claim 7 wherein the software, when executed, is further operable to:
perform the steps of adjusting the calling code breakout and adjusting the prices without human interaction.

9. The system of claim 7 wherein the software, when executed, is further operable to:
convert a format data of code and rate information included in the first price breakout for the seller to a format readable by the buyer of the telecommunication services.

10. The system of claim 9 wherein the format data includes formatting information relating to at least one of the group consisting of: names, fields, text formatting, file format, medium to rates, and a time and date window during which the telephone call should be conducted.

11. A system for processing a telephone call comprising a computer; and software that, when executed, is operable to:
retrieve a first price breakout of telecommunication services, associated with the telephone call, from a seller of the services;
retrieve a second price breakout of the telecommunication services from a buyer of the services;
reconcile the first price breakout with the second price breakout to generate a final price for the telecommunication services;
process the telephone call between the buyer and the seller using the final price;
obtain estimated telecommunication traffic indicative of the telecommunication services for which the first and second price breakouts were retrieved; and
calculate the final price of the telecommunication services using the obtained estimated traffic.

12. The method of claim 11 wherein the estimated telecommunication traffic is based on one or more of the group consisting of:
a) a traffic estimate of the buyer;
b) overall historical traffic patterns of the seller; and
c) where the buyer identifies a segment of a network for use of the telecommunication services, historical traffic patterns of the seller within the identified segment.

13. A method for processing a telephone call taking place in a telephone network between a seller and buyer of services communicating on the telephone network, the telephone call having a calling code associated therewith, said reconciling mismatch in calling information between a buyer and a seller, comprising:

retrieving a breakout of the seller's calling codes having a plurality of respective prices, said retrieving step being performed using a computer;

retrieving a breakout of the buyer's calling codes, including one or more buyer calling codes having one or more respective buyer prices; and modifying the breakout of seller calling codes to provide a second seller breakout of calling codes that matches the breakout of buyer calling codes, whereby the prices for the calling codes in the second seller calling-code breakout to match the buyer prices corresponding to the buyer calling codes.

14. The method of claim 13 further comprising:

completing a telephone call using the adjusted matching calling code prices.

15. The method of claim 13 further comprising:

completing a telephone call for a given calling code if a seller price for the given calling code is less than or equal to the buyer price for the given calling code.

* * * * *